G. C. & J. H. MORGAN.
Wind-Mill.
No. 132,729. Patented Nov. 5, 1872.
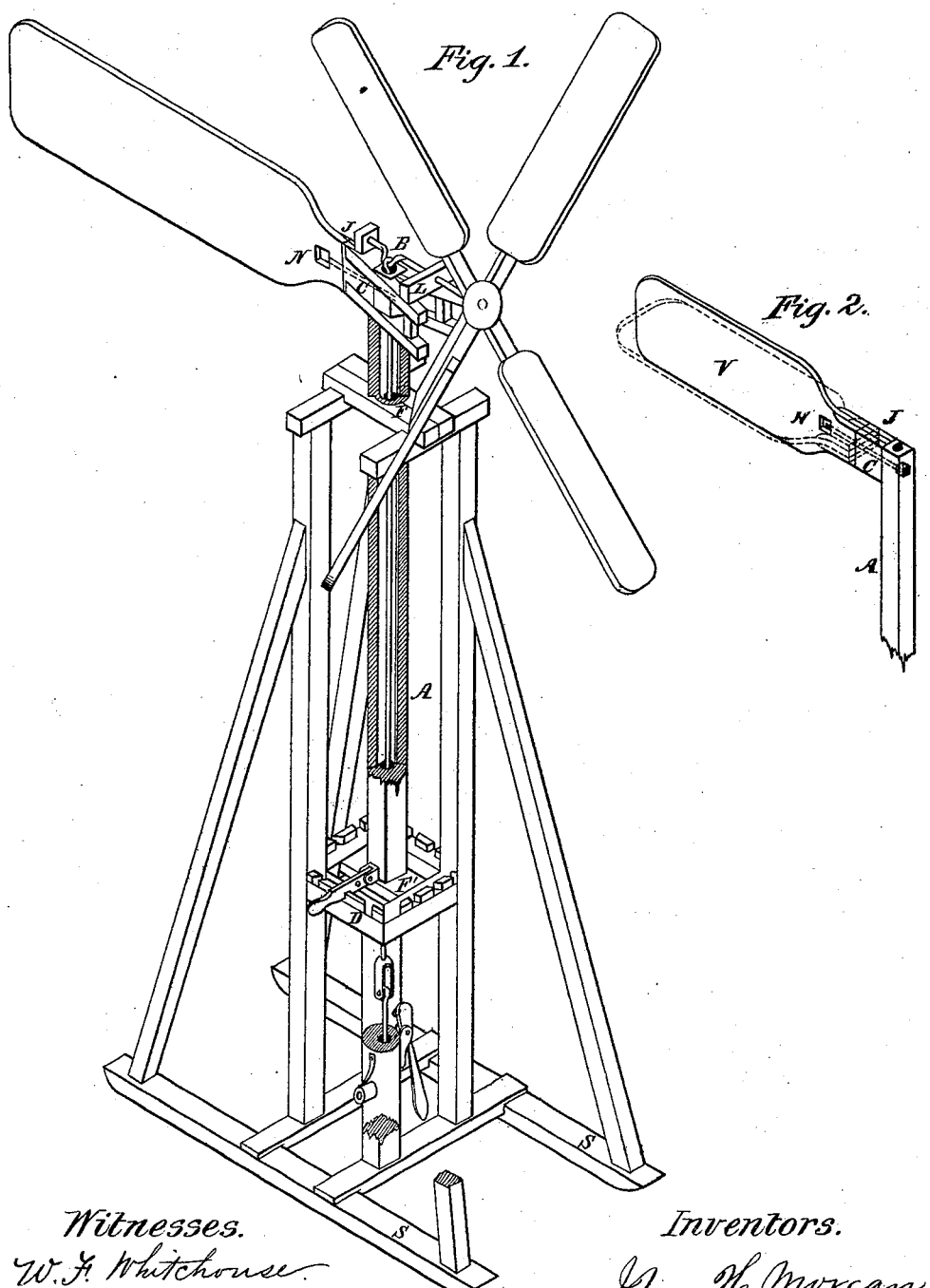
Witnesses.
W. F. Whitehouse
Wm Zimmerman
Inventors.
John H. Morgan
George C. Morgan

UNITED STATES PATENT OFFICE.

GEORGE C. MORGAN, OF CHICAGO, AND JOHN H. MORGAN, OF ASHKUM, ILL.

IMPROVEMENT IN WINDMILLS.

Specification forming part of Letters Patent No. 132,729, dated November 5, 1872.

*To all whom it may concern:*

Be it known that we, GEORGE C. MORGAN, of Chicago, in the county of Cook and State of Illinois, and JOHN H. MORGAN, of the town of Ashkum, in the county of Iroquois and State of Illinois, have invented certain Improvements in Windmills, of which the following is a specification:

The said improvements are set forth substantially and made plain by the following description and accompanying drawing.

Figure I represents the sails of the windmill as set upon a crank-shaft, marked B, the crank of which is placed directly over the center of a hollow revolving shaft, marked A, and standing upright, through which the pump-rod or power-rod passes from the crank-shaft B and is attached to any ordinary pump or machine below. Upon the upright shaft A is fastened a suitable frame-work or head to receive the bearings of the crank-shaft B, which frame, together with the tail, marked V, of the windmill, form a solid head, marked L, resting upon the upright shaft A, the whole apparatus turning with the wind upon the bearings, marked F F. The upright shaft A is put in an upright frame properly braced, and the whole is mounted upon skids or runners, marked S S, so that the whole apparatus is made portable.

Fig. II represents a joint, marked J, which could not be clearly represented in the tail-piece of Fig. I. The tail V of the windmill is held in its place by a bolt, marked C, as shown in dotted lines, passing through the head of the upright shaft A, and is held in its place by a nut at N.

Whenever it becomes necessary, from high winds or other causes, to prevent the sails from facing the wind, the nut at N may be loosened and the tail V turned into a horizontal plane, as shown by the dotted outline.

What we claim as new, and desire to secure by Letters Patent, is—

1. The upright revolving hollow shaft A, in combination with the head L, upper bearing F, and lower bearing F' to give strength and steadiness to the shaft, substantially as specified.

2. The tail or vane V, when provided with the joint J, so that it can be changed from a vertical to a horizontal position, substantially as and for the purposes specified.

GEORGE C. MORGAN.
JOHN H. MORGAN.

Witnesses:
H. A. GARDNER, JR.,
WM. ZIMMERMAN.